US005452818A

United States Patent [19]
Yost

[11] Patent Number: 5,452,818
[45] Date of Patent: Sep. 26, 1995

[54] REUSABLE BEVERAGE CAN CLOSURE

[76] Inventor: Kenneth J. Yost, 10 Candy Ct., Eaton, Ohio 45310

[21] Appl. No.: 231,699

[22] Filed: Apr. 25, 1994

[51] Int. Cl.⁶ .................................................. B65D 51/22
[52] U.S. Cl. ........................ 220/258; 220/240; 220/306; 220/721; 220/DIG. 17
[58] Field of Search ..................................... 220/212, 240, 220/258, 306, 721, 729, 734, 906, DIG. 17

[56] References Cited

U.S. PATENT DOCUMENTS

| Re. 27,301 | 2/1972 | Lutzker . | |
|---|---|---|---|
| 3,622,034 | 11/1971 | Lutzker et al. . | |
| 3,721,362 | 3/1973 | Barry et al. . | |
| 4,014,459 | 3/1977 | Robinson | 220/380 |
| 4,410,102 | 10/1983 | Lutzkler . | |
| 4,416,383 | 11/1983 | Frahm et al. . | |
| 4,442,947 | 4/1984 | Banich, Sr. . | |
| 4,453,646 | 6/1984 | Harrild | 220/258 |
| 4,709,832 | 12/1987 | Mantyla | 220/306 |
| 4,723,676 | 2/1988 | Kobyashi et al. . | |
| 4,768,669 | 9/1988 | Kane et al. . | |
| 4,856,674 | 8/1989 | Berney | 220/258 |
| 5,123,558 | 6/1992 | Moloney | 220/212 |
| 5,143,241 | 9/1992 | Szymanski . | |
| 5,176,278 | 1/1993 | Quarberg . | |
| 5,203,467 | 4/1993 | Tucker . | |
| 5,209,362 | 5/1993 | Lutzker . | |
| 5,221,020 | 6/1993 | Brimo, II . | |
| 5,240,132 | 8/1993 | Tucker . | |
| 5,242,073 | 9/1993 | Willis et al. | 220/240 |
| 5,259,522 | 11/1993 | Morton . | |
| 5,312,010 | 5/1994 | Johnson | 220/306 |

Primary Examiner—Stephen J. Castellano
Assistant Examiner—Stephen Cronin
Attorney, Agent, or Firm—Killworth, Gottman, Hagan & Schaeff

[57] ABSTRACT

A one-piece closure for resealing and repressurizing an opened beverage container is provided. The closure comprises a body portion with an annular skirt integral to and descending therefrom. The closure further comprises an annular flange integral to and extending radially inward from the annular skirt. The flange provides an air-tight seal with the sides of a beverage container. The closure is reusable and is especially useful with standard tab-top soda containers.

7 Claims, 2 Drawing Sheets

REUSABLE BEVERAGE CAN CLOSURE

BACKGROUND OF THE INVENTION

The present invention relates to a reusable closure for beverage cans, and in particular relates to a reusable closure for beverage cans that is capable of repressurizing opened cans during both storage and use.

As is common in the industry, carbonated beverages are regularly dispensed in cans made from aluminum and/or similar materials. Access to such containers is commonly made from a puncturable seal on top of the can. Unfortunately, such conventional puncturable seal cans provide no means for resealing the container once opened. Accordingly, open cans quite frequently experience a loss of carbonation, spillage or a variety of other problems.

The problem of loss of carbonation from carbonated beverages has long been recognized. This problem is most often encountered when a portion of a beverage is consumed and the remainder is saved for consumption at a later time. Since the container no longer has a gas-tight seal, vapor pressure can not build-up within the container to prevent the evaporation of carbonic acid. This loss of carbonic acid from the beverage results in a loss of "fizz"idue to a lack of carbonation. As a result, the beverage quite often has a "flat" or stale taste and is undesirable to consume. Thus, it would be desirable to prevent loss of carbonation from an opened beverage container.

As a result of this loss of carbonation, a number of various closures have been proposed to preserve the contents of a beverage container. However, due to various deficiencies, specifically a capability to reseal but no capability to repressurize, none is considered to be fully satisfactory.

U.S. Pat. No. 5,203,467 to Tucker and U.S. Pat. No. 5,240,132 also to Tucker both disclose protective caps for beverage containers. Both caps are designed to snap-fit over the top of a beverage can and provide a gas tight seal. Both caps also include a hinged cover on the cap over the container opening as well as a grating to keep insects out. However, neither the '467 patent or the '132 patent disclose an annular sealing gasket integral with the cap. Further, both caps are capable of resealing but are not capable of repressurizing the contents of the container. Also, the caps are both multi-part designs increasing manufacturing cost and potential problems during use.

U.S. Pat. No. 5,221,020 to Brimo II discloses a reusable beverage can cap. The cap in Brimo is also a multi-component cap having a hard outer shell, a resilient liner and an inner elastomeric member. Again, the cap is a complicated three part design without an annular gasket integral with the cap and is not capable of repressurizing the contents of the container.

U.S. Pat. No. 5,176,278 to Quarberg discloses a reusable beverage can cap. The cap is a multi-component cap having a cover member with a pour spout on top, a clamping member to clamp the cover member to the can and a cap to seal the pour spout. Once again, the cap is a complicated multi-component design without an annular gasket integral with the cap and no capability to repressurize the contents of the container.

U.S. Pat. No. 5,209,362 to Lutzker also discloses a cap for resealing a beverage can. The cap is a multi-component closure having an outer locking member, an inner latching member and a sealing gasket. Again, however, the cap is a complicated multi-component design, not capable of repressurizing a container and the annular gasket is not integral with the cap, but rather, is a separate gasket. Thus, both manufacturing and use are complicated, manufacturing due to the multi-part design, use because if the gasket is misplaced or lost, the cap loses is functionality.

Accordingly, a need still exists in the art for a one-piece closure for resealing and repressurizing beverage cans that is not only simple to manufacture, but, also simple to use.

SUMMARY OF THE INVENTION

This need is met by the present invention whereby a one-piece closure for resealing and repressurizing opened beverage containers is provided. The closure reseals a beverage container by forming an air-tight seal with the container's sides. The container is repressurized through the use of air entrapped and compressed by the closure as it is pressed downward over the top of the container. Additionally, the closure of the present invention is reusable with no separate parts or components that can wear out or be lost.

In accordance with the present invention, a one-piece closure of a resilient thermoplastic polymer is provided. The closure comprises a substantially rigid circular body portion, a substantially rigid annular skirt and an annular flange. The annular skirt is integral with the annular body portion. The annular skirt descends from the circular body portion to form the sides of the closure while the body portion comprises the top of the closure. Preferably, the annular skirt is of a length sufficient enough to entrap and compress air as the closure is pressed onto the top of a beverage container.

The annular flange is integral with the annular skirt. The annular flange extends radially inward from the annular skirt a distance great enough such that the inner diameter of the closure is less than the outer diameter of a beverage container. In this manner, the annular flange bends or flexes to form an air-tight seal with the sides of a container when the closure is attached to the container. Preferably, the inner diameter of the closure, i.e. the inner diameter of the annular flange, is initially approximately 2.2 inches.

In a further embodiment of the present invention, the annular flange is initially at an angle to a horizontal plane drawn through the bottom of the annular skirt. In other words, the annular flange is not horizontal. But rather, is at an angle up from a horizontal position. Preferably, the initial angle is within the range of approximately 5° to approximately 30°, more preferably approximately 15°.

The annular flange is preferably more flexible than the body portion or the annular skirt which is accomplished by forming it of a reduced thickness as compared to the thickness of the body portion and the annular skirt. Further, the initial inner diameter of the closure is less than the outer diameter of the container. Thus, as the closure is centered by aid of flange 18's conical configuration and 15 pressed onto the container, the angle of the annular flange increases from its initial value, and the inner diameter of the closure is increased to fit over the container. As the closure is pressed on to the container, contained air volume is reduced thereby generating pressure over the beverage remaining in the container.

Accordingly, it is a feature of the present invention to provide a reusable, one-piece closure for a beverage container with an integral flange that is capable of resealing and repressurizing the container. Other features and advantages of the invention will be apparent from the following description, the accompanying drawings and the appended claims.

DETAILED DESCRIPTION OF THE INVENTION

The present invention comprises a reusable, one-piece closure for resealing and repressurizing an opened beverage container. The closure is adapted to fit most types of beverage containers. It is especially useful as a closure for a standard tab-top soda beverage container. The closure of the present invention has dual functioning capabilities. It can be used either for storage of an opened beverage or it can be used while the beverage is being consumed, i.e. between drinks or sips. The closure of the present invention and its attendant advantages will be further described by reference to the accompanying figures.

Figure 3:
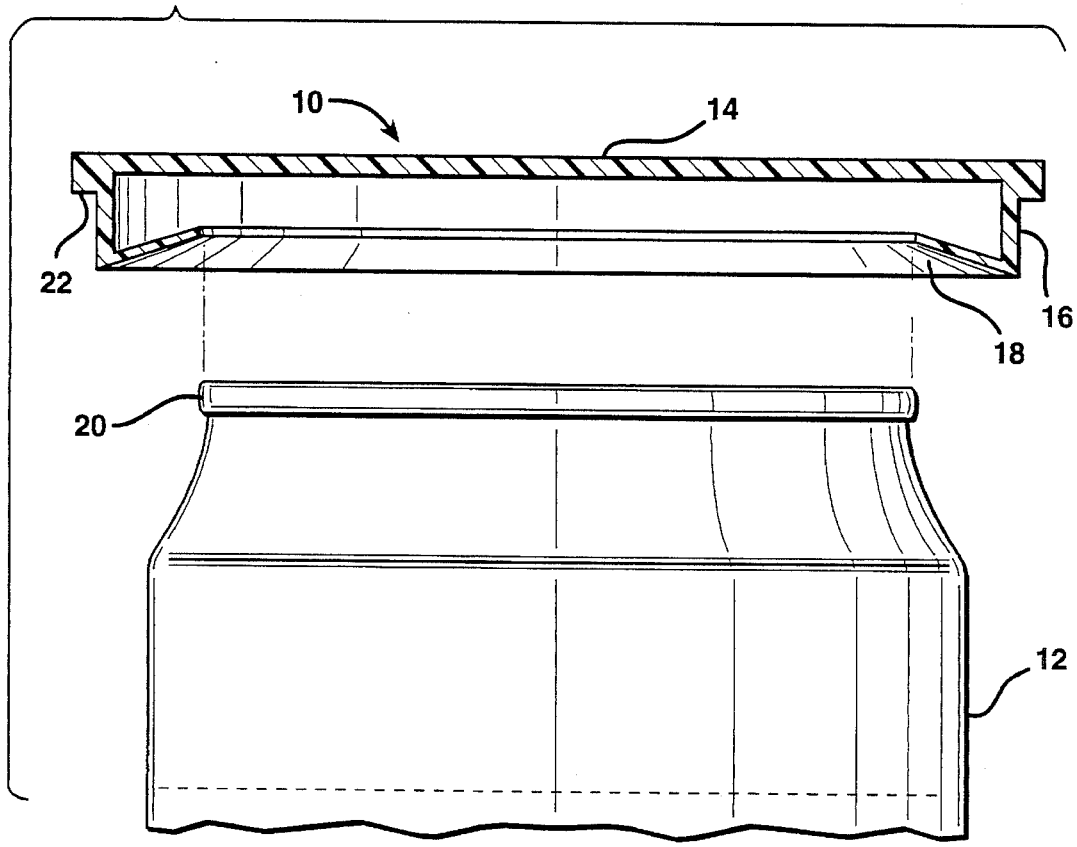
FIG. 3 is a cross-sectional view of the closure of the present invention along line 3—3 of FIG. 2.

Referring to FIG. 3, there is seen a cross-sectional view of the closure 10 of the present invention positioned above a beverage container 12. The closure consists of an circular body portion 14, an annular skirt 16 and an annular flange 18. Body portion 14 is formed as a substantially rigid circular sheet. Body portion 14 must be substantially rigid in order to maintain the pressure generated as the closure is placed on the container. If body portion 14 bows or gives, then the generated pressure is reduced allowing carbonation to escape, as in prior art closures which can seal but not repressurize the container. Further, body portion 14 is formed as a solid circular sheet with no openings or breaks as to maintain generated pressure.

Annular skirt 16 is integral with body portion 14. Annular skirt 16 is also a substantially rigid member. Again, the rigidity is required to maintain pressure generated when the closure is placed on the container. If annular skirt 16 flexes or gives any substantial amount, then the seal between flange 18 and the container sides will be broken.

Annular skirt 16 descends from body portion 14 forming the side wall of closure 10. When closure 10 is attached to beverage container 12, air is trapped between closure 10 and the beverage remaining in container 12. The downward travel of closure 10 over the top of container 12 compresses the entrapped air between the remaining beverage and the closure thereby repressurizing the container. Thus, the length of annular skirt 16 determines the distance closure 10 can travel downward and accordingly, the of amount pressure that can be created within the container. Therefore, annular skirt 16 should have a length sufficient to repressurize container 12. Preferably, annular skirt 16 should have a length of at least approximately 0.350" of an inch or more.

Annular flange 18 is integral with annular skirt 16. Flange 18 is formed to be more flexible than body portion 14 or annular skirt 16. This is accomplished by forming flange 18 to be of a reduced thickness as compared to the thickness of either body portion 14 or annular Skirt 16. Preferably, flange 18 is within the range of approximately 10 to 25 thousandths of an inch. Flange 18 extends radially inward from annular skirt 16 a distance sufficient so that the inner diameter of closure 10 is less than the outer diameter of container 12. Thus, closure 10 must be pressed or forced down over the top of container 12 and annular flange 18 forms an air-tight seal with the sides of the beverage container.

Figure 2:
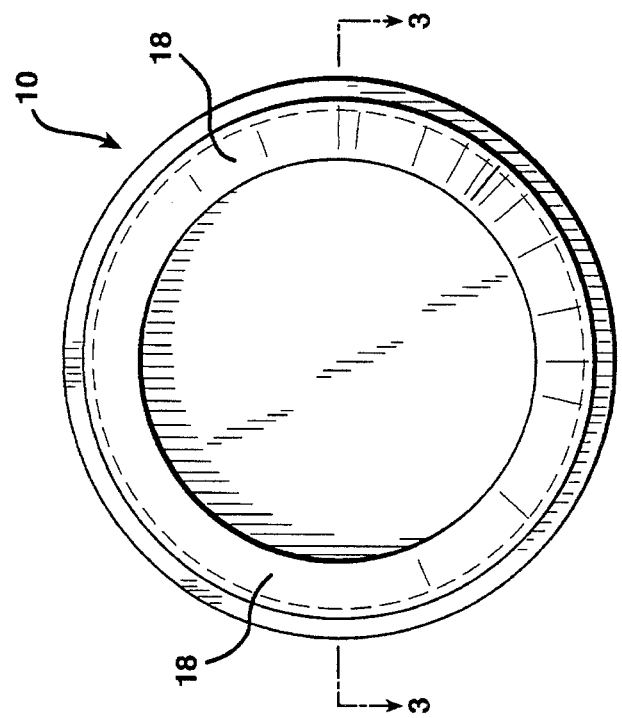
FIG. 2 is a bottom plan view of the closure of the present invention.
Figure 1:
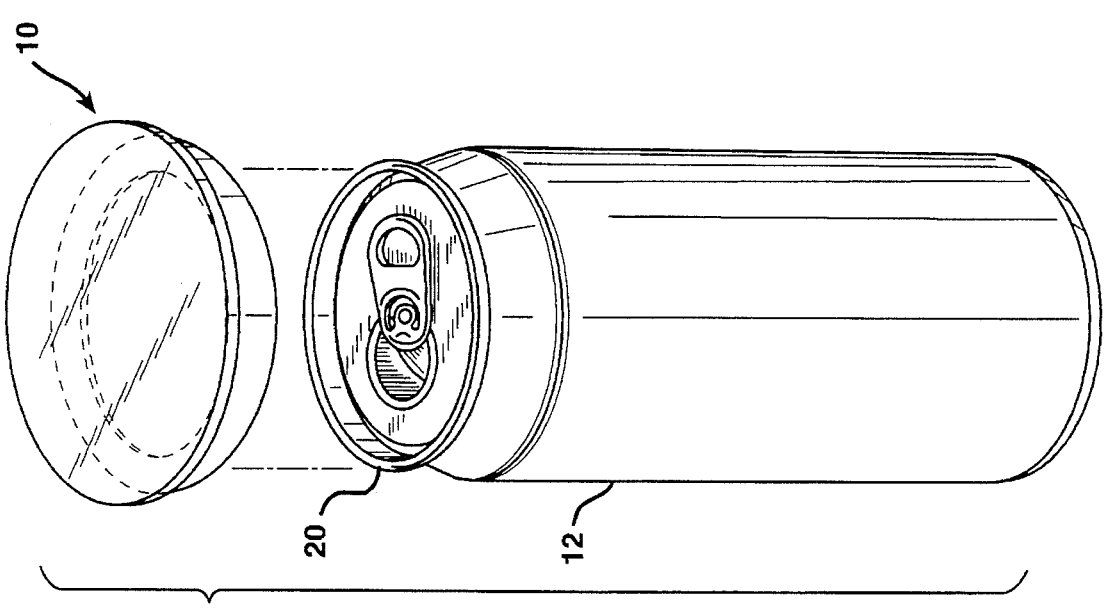
FIG. 1 is a perspective view of the closure of the present invention and a beverage container.

FIG. 2 shows a bottom plan view of closure 10. The inner diameter of closure 10 is intended to be the distance of a straight line drawn from one edge of annular flange 18 through the center to the opposite point on the edge of annular flange 18. FIG. 1 shows a perspective view of closure 10 over container 12. The outer diameter of container 12 is intended to be the distance of a straight line from the outer edge of rim 20 through the center to the outer edge of rim 20 on an opposite point of the container. The inner diameter of closure 10 is preferable approximately 2.2 inches. However, the inner diameter of closure 10 can vary according to the outer diameter of the beverage container to be resealed and can easily be determined by one of ordinary skill in the art.

Preferably, annular flange 18 is formed at an initial angle. The initial angle is determined by measuring the degree of incline of flange 18 from a horizontal plane drawn through the bottom of annular skirt 16. The initial angle of annular flange 18 can be as great as desired and still maintain a seal with the sides of container 12 when closure 10 is attached to its top. Preferably, the initial angle is from approximately 5° to approximately 30°, and more preferably approximately 15°.

Figure 4:
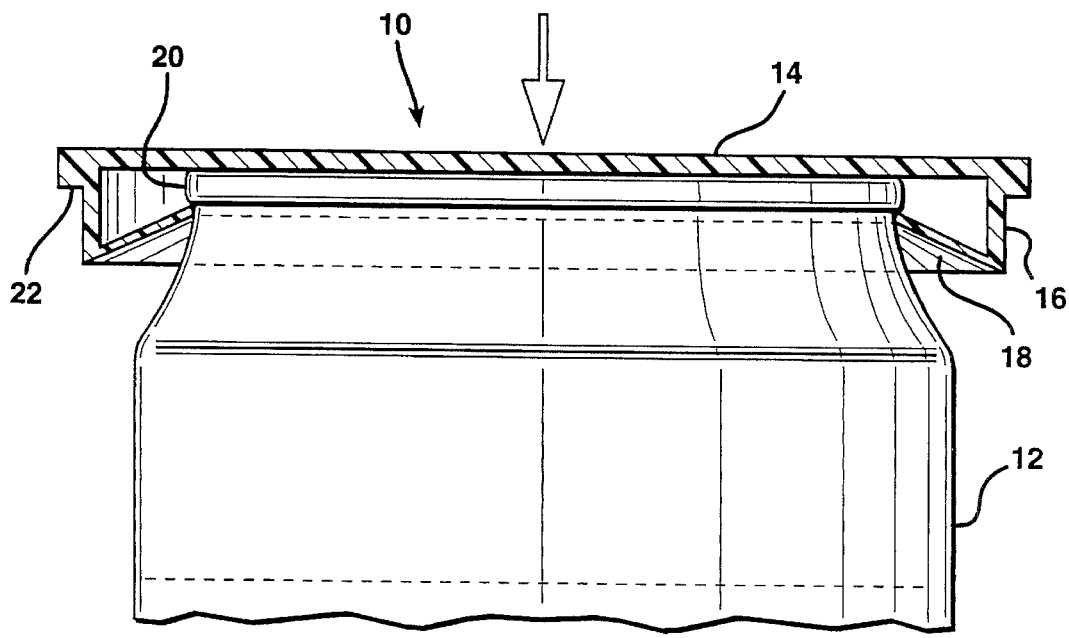
FIG. 4 is a cross-sectional view of the closure of the present invention when attached to a beverage container.

As inner flange 18 has an inner diameter less than the outer diameter of container 12 and is flexible, when closure 10 is pressed downward over the top of container 12, annular flange 18 bends to an angle greater than the initial angle. As can be seen in FIG. 4, when closure 10 is attached to container 12, the angle from a horizontal plane drawn through the bottom of annular skirt 16 is greater. When the angle of flange 18 increases, the inner diameter of closure 10 increases a corresponding amount. This increased angle plus the act of pressing flange 18 down over the top of container 12, both reduce contained air volume as shown to generate pressure over the beverage remaining in the container. In this manner, the container is repressurized by closure 10.

Standard beverage containers are manufactured with a top edge or rim of the container that extends out from a curved container neck, as is shown in FIG. 3. This rim 20 normally extends approximately 0.010inches from the side of the container. During the attachment of closure 10 on container 12, flange 18 bends as the closure is pressed over rim 20. Once the closure is pressed over the container top, flange 18 is fixed into place by rim 20 and the container sidewalls. That is, rim 20 prevents flange 18 from moving upward while the curve of container sidewall prevents flange 18 from moving downward, as can be seen in FIG. 4. In this manner, closure 10 is held firmly in place on the container.

Closure 10 is removed with minimal effort from a container by simply pulling or prying flange 18 over the rim of a container. Preferably, body portion 14 will be extended beyond annular skirt 16 to form a tab 22. Tab 22 enables one to get a better grip on closure 10 thereby allowing, if needed, more torque to be applied in prying closure 10 from a container top.

Closure 10 may be manufactured from any suitable Food and Drug Administration compliant thermoplastic resin known in the art. The material employed must be an FDA compliant material. Thus, the material can contain no reground or recycled materials. Such materials are generally referred to as virgin materials. Non-virgin materials are not satisfactory for food applications. Examples of satisfactory materials include polypropylene, ultra high molecular weight polyethylene, low density polyethylene, high density polyethylene, vinyl resin or the like. Preferably, the material employed is a virgin polypropylene. Polypropylene is an extremely resilient material and can be repeatedly flexed without losing its original dimensions. Further, polypropylene can withstand repeated temperatures of up to approximately 250° F. and, thus, is dishwasher safe.

The closure is manufactured from an injection molding process. Pellets of a suitable thermoplastic resin are melted and injected as a liquid into a metal mold. After cooling, the crude closure is released from the mold. Flange 18 is cut out to specifications on a lathe and the inner diameter of the closure is refined.

An alternate method of manufacture is to mold flange 18 with skirt 16 but to cementsbody portion 14 as a separate part onto the upper edge of skirt 16.

The closure of the present invention can be designed for use with any size beverage container. The closure is particularly suited for use with a standard tab-top soda can or container. Further, the closure of the present invention is functional during both long term storage or consumption of beverages.

The closure of the present invention is completely reusable with no separate components or pieces. Separate components can wear out causing leaks. Thus, a multi-piece closure has a limited lifetime. Separate components may also become misplaced or lost rendering the closure inoperative. On the other hand, the closure of the present invention is a one-piece device which is both simple and inexpensive to manufacture, simple to operate and reusable for an indefinite period of time.

Having described the invention in detail and by reference to the preferred embodiments thereof, it will be apparent that modifications and variations are possible without departing from the scope of the invention which is defined in the appended claims.

What is claimed is:

1. An one-piece closure for repressurizing an opened beverage container comprising:

a substantially rigid circular body portion, a substantially rigid annular skirt integrally descending from said circular body portion, and an annular flexible flange integral with said annular skirt, said annular flange extending radially inward a distance such that the inner diameter of said closure is less than the outer diameter of the beverage container, said annular flange having an initial angle to a horizontal plane through the bottom of said annular skirt within the range of from approximately 5° to approximately 30° so that as said closure is attached to the beverage container said annular flexible flange bends to form an angle greater than said initial angle and sealingly engages the sides of the beverage container.

2. The closure as claimed in claim 1 wherein said annular skirt descends downward a length great enough such that as said closure is attached to the beverage container air is entrapped by the closure and compressed to repressurize the beverage container.

3. The closure as claimed in claim 1 wherein said initial angle of said annular flange is approximately 15°.

4. The closure as claimed in claim 1 wherein said inner diameter of said closure is initially approximately 2.2 inches.

5. The closure as claimed in claim 1 wherein said closure is selected from the group consisting of polypropylene, ultra high molecular weight polyethylene, low density polyethylene, high density polyethylene, and vinyl resin.

6. The closure as claimed in claim 5 wherein said closure is polypropylene.

7. The closure as claimed in claim 1 wherein said body portion includes a tab extending beyond said annular skirt.

* * * * *